(12) United States Patent
Versteyhe et al.

(10) Patent No.: US 9,109,645 B2
(45) Date of Patent: Aug. 18, 2015

(54) METHOD AND APPARATUS FOR PREFILL OF WET CLUTCHES

(71) Applicant: Spicer Off-Highway Belgium N.V., Bruges (BE)

(72) Inventors: Mark R. J. Versteyhe, Oostkamp (BE); Mark M. A. Maessen, Roermond (NL)

(73) Assignee: Dana Belgium N.V., Bruges (BE)

( * ) Notice: Subject to any disclaimer, the term of this patent is extended or adjusted under 35 U.S.C. 154(b) by 0 days.

(21) Appl. No.: 14/178,390

(22) Filed: Feb. 12, 2014

(65) Prior Publication Data

US 2014/0224613 A1    Aug. 14, 2014

Related U.S. Application Data

(60) Provisional application No. 61/764,044, filed on Feb. 13, 2013.

(51) Int. Cl.
 *F16D 25/06* (2006.01)
 *F16D 48/06* (2006.01)

(52) U.S. Cl.
 CPC ............ *F16D 25/06* (2013.01); *F16D 48/066* (2013.01); *F16D 2500/5035* (2013.01)

(58) Field of Classification Search
 CPC  F16D 25/06; F16D 48/066; F16D 2500/5035

USPC ............... 192/85.63, 48.601, 109 F
 See application file for complete search history.

(56) References Cited

U.S. PATENT DOCUMENTS

| | | | | | |
|---|---|---|---|---|---|
| 3,799,308 | A | * | 3/1974 | Erisman ................. | 192/48.601 |
| 6,761,600 | B2 | * | 7/2004 | Daus et al. ..................... | 440/75 |
| 6,789,658 | B2 | * | 9/2004 | Busold et al. ............. | 192/103 F |
| 8,662,272 | B2 | * | 3/2014 | Martin et al. ............ | 192/48.601 |
| 8,739,950 | B2 | * | 6/2014 | Lundberg et al. ........ | 192/48.601 |
| 2008/0190729 | A1 | * | 8/2008 | Stehr et al. .................. | 192/85 R |

* cited by examiner

*Primary Examiner* — David J Hlavka
(74) *Attorney, Agent, or Firm* — Marshall & Melhorn, LLC

(57) ABSTRACT

A method and an apparatus for controlling a wet clutch are provided. The clutch comprises a pump, a piston, and a fluid conduit. The pump provides a housing with a hydraulic fluid. The piston is movably disposed in the housing and is movable into an extended position by a preloaded spring and into a retracted position by applying an engagement pressure on the piston by the hydraulic fluid. In the retracted position torque is transmittable through the clutch. The fluid conduit connects the pump and the housing. The method comprises the steps of prefilling the clutch by applying a prefill pressure on the piston, prefilling the fluid conduit line and the housing with the hydraulic fluid. The prefill pressure is lower than the engagement pressure required to move the piston into the retracted position.

12 Claims, 4 Drawing Sheets

METHOD AND APPARATUS FOR PREFILL OF WET CLUTCHES

CLAIM OF PRIORITY

The present application claims the benefit of priority to U.S. Provisional Application No. 61/764,044 filed on Feb. 13, 2013, which is incorporated herein in its entirety by reference.

FIELD OF THE INVENTION

The present invention relates to the operation of hydraulic clutches and more specifically to a method of prefilling a hydraulic clutch.

BACKGROUND OF THE INVENTION

In the shifting of a stepped ratio transmission, clutches are engaged and disengaged to allow for power transfer through a plurality of different power paths. Typically, when a shift is performed, one clutch is disengaged (also known as an off-going clutch) by decreasing an oil pressure on a piston of the clutch and another clutch is engaged (also known as an oncoming clutch) by increasing a pressure on a piston of the clutch. During an overlap shift, this process happens simultaneously in a coordinated manner. In a filling phase of a shift, the piston of the ongoing clutch is positioned adjacent a plurality of friction plates by regulating a pressure of the transmission fluid.

One of the problems with filling the ongoing clutch is a repeatability of the filling process. For a system that is actuated using feedforward control, a changing system is problematic. Feedforward control means that the system responds to a control signal in a predefined way, and does not take into account a reaction based on a load. A needed width (also known as a length in time) of a pressure profile that is used to actuate a piston depends on an amount of air that is present in a plurality of hydraulic lines associated with the piston and a total length of the hydraulic lines. There is also considerable variability in an amount of oil which is present in the hydraulic lines and in the clutch. This is a result of temperature, rotational speed, a varying amount of time between shifts, and pressure dependent draining and leakage. Furthermore, some mechanical parameters of the system are uncertain. One such parameter is a stiffness of a return spring, which has a large tolerance in production. While some of these effects can be counteracted using a calibration procedure, the system is hard to accurately characterize and the system will still exhibit inconsistent behavior. Consequently, a shift quality of the system is affected negatively.

A current state of the art of control techniques does not account for a draining of the clutch. A set of optimized parameters for a filling phase is determined during a calibration session in which the clutch is repeatedly opened and closed. The process is performed with a fixed time between the opening and closing, ignoring the effect that the time between shifts has on a behavior of the system. While this method is also performed at a relatively fixed temperature, a correction factor is used during the filling process to account for the temperature.

In conclusion, the state of the art disregards for the effect of draining, aside from a temperature dependent correction on the filling time, instead of a time dependent correction. Shifts are performed using feedforward control with a considerably changing reaction. As a result, poor shifts occur in situations where the conditions vary from the parameters present during the calibration. However, even when the calibration parameters are present, large variability can have a detrimental effect on the shift quality. FIG. 1 illustrates several consecutive fillings that were performed with the same or similar pressure signals, and are shown using dashed lines. As shown in FIG. 1, a plurality of measured response to the pressure signals, shown using solid lines, differ vastly.

The measured response is dependent on a temperature as well as a time between shifts. A precise correction for both temperature and time between shifts is needed. The state of the art only contemplates temperature compensation. While a compensation for the time between shifts could also be added, the number of parameters influencing the system makes such a task increasingly complex. Furthermore, it is expected that large variability would still remain, despite compensating for the time between shifts.

It would be advantageous to develop a method of prefilling a hydraulic clutch that increases a repeatability of a clutch filling process, accounts for a draining of the clutch, accounts for a temperature at which a shift is performed, and accounts for a time between shifts.

SUMMARY OF THE INVENTION

Presently provided by the invention, a method of prefilling a hydraulic clutch that increases a repeatability of a clutch filling process, accounts for a draining of the clutch, accounts for a temperature at which a shift is performed, and accounts for a time between shifts, has surprisingly been discovered.

In one embodiment, the present invention is directed to a method for controlling a wet clutch. The clutch comprises a pump, a piston, and a fluid conduit. The pump provides a housing with a hydraulic fluid. The piston is movably disposed in the housing. The piston is movable into an extended position by a preloaded spring and into a retracted position by applying an engagement pressure on the piston by the hydraulic fluid. In the retracted position torque is transmittable through the clutch. The fluid conduit connects the pump and the housing. The method comprises the steps of prefilling the clutch by applying a prefill pressure on the piston, thereby prefilling the fluid conduit line and the housing with the hydraulic fluid. The prefill pressure is lower than the engagement pressure required to move the piston into the retracted position.

In another embodiment, the present invention is directed to an apparatus for controlling a wet clutch. The apparatus includes a pump, a piston, a fluid conduit, and an electroproportional valve. The pump provides a housing with a hydraulic fluid. The piston is movably disposed in the housing. The piston is movable into an extended position by a preloaded spring and into a retracted position by applying a engagement pressure on the piston by the hydraulic fluid. In the retracted position torque is transmittable through the clutch. The fluid conduit connects the pump and the housing. The electroproportional valve is disposed between the pump and the housing for regulating the pressure of the hydraulic fluid in the housing. The electroproportional valve is configured to prefill the housing by applying a prefill pressure on the piston, thereby prefilling the fluid conduit and the housing with the hydraulic fluid. The prefill pressure is lower than the engagement pressure required to move the piston into the retracted position.

Various aspects of this invention will become apparent to those skilled in the art from the following detailed description of the preferred embodiment, when read in light of the accompanying drawings.

BRIEF DESCRIPTION OF THE FIGURES

The above, as well as other advantages of the present invention will become readily apparent to those skilled in the art from the following detailed description when considered in the light of the accompanying drawings in which.

DETAILED DESCRIPTION OF THE INVENTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless expressly stated otherwise.

Figure 1:
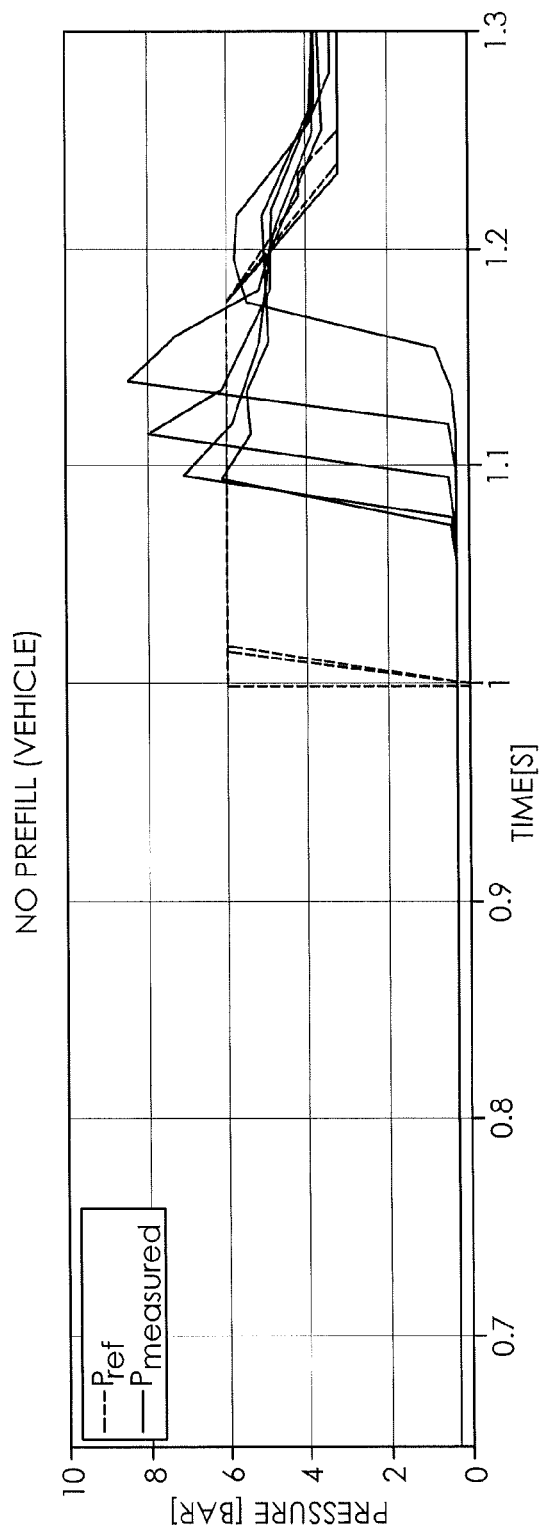
FIG. 1 is a graph which illustrates several pressure profiles of an engaging hydraulic piston associated with a wet clutch known in the prior art.
Figure 2:
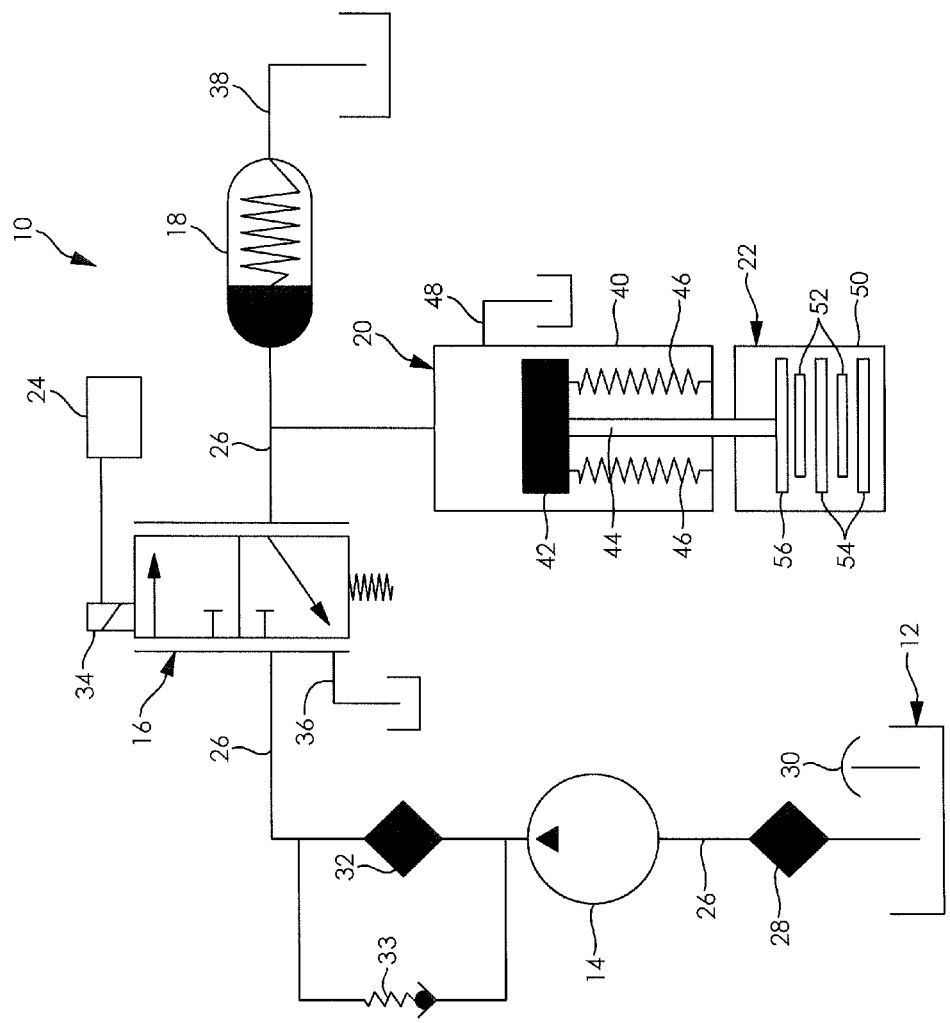
FIG. 2 is a schematic illustration of a multi-plate clutch system according to the present invention.

FIG. 2 illustrates a multi-plate clutch system 10. The multi-plate clutch system 10 is an electrohydraulically actuated wet plate clutch system. The multi-plate clutch system 10 comprises a sump 12, a high pressure pump 14, an electroproportional valve 16, an accumulator 18, a piston assembly 20, a clutch assembly 22, a controller 24, and a plurality of fluid conduits 26. The high pressure pump 14 is in fluid communication with the sump 12 and the electroproportional valve 16. The piston assembly 20 is in fluid communication with the electroproportional valve 16 and the accumulator 18. The clutch assembly 22 is disposed adjacent to and may be placed in contact with a portion of the piston assembly 20. The controller 24 is in communication with the electroproportional valve 16.

The sump 12 is a container in which a hydraulic fluid is stored. The sump 12 is in fluid communication with the high pressure pump 14. One of the fluid conduits 26 affords fluid communication between the sump 12 and the high pressure pump 14. A filter 28 forms a portion of the fluid conduit 26 between the sump 12 and the high pressure pump 14. The sump 12 includes a breather 30, to facilitate fluid communication between an ambient environment of the multi-plate clutch system 10 and an interior of the sump 12.

The high pressure pump 14 is a fixed displacement hydraulic pump. The high pressure pump 14 is in fluid communication with the sump 12 and the electroproportional valve 16. As a non-limiting example, the high pressure pump 14 may generate a pressure of about 20 bar. One of the fluid conduits 26 affords fluid communication between the high pressure pump 14 and the electroproportional valve 16. A filter 32 forms a portion of the fluid conduit 26 between the high pressure pump 14 and the electroproportional valve 16. A pressure relief valve 33 is present to limit a pressure difference across the filter 32 created by the high pressure pump 14, such as if the filter 32 becomes obstructed. Further, it is understood that the high pressure pump 14 may also be in fluid communication with a pressure limiting valve (not shown). The pressure limiting valve limits a pressure within the fluid conduit 26 between the high pressure pump 14 and the electroproportional valve 16.

The electroproportional valve 16 is a hydraulic valve in fluid communication with the high pressure pump 14, the piston assembly 20, and the accumulator 18. The electroproportional valve 16 is in electrical communication with the controller 24. The electroproportional valve 16 is supplied with a pulse width modulated signal to apply a current to a solenoid 34 forming a portion of the electroproportional valve 16. Upon receipt of the pulse width modulated signal, the electroproportional valve 16 may be placed in at least a partially open position. In the open position, the electroproportional valve 16 afford fluid communication between the fluid conduit 26 between the high pressure pump 14 and the electroproportional valve 16 and a fluid conduit 26 between the electroproportional valve 16, the piston assembly 20, and the accumulator 18. It is understood that the controller 24 may adjust the pulse width modulated signal to adjust a pressure within the fluid conduit 26 between the electroproportional valve 16, the piston assembly 20, and the accumulator 18 by placing the electroproportional valve 16 in at least the partially open position. As shown in FIG. 2, the electroproportional valve 16 includes a draining orifice 36. A flow of hydraulic fluid through the draining orifice 36 is dependent on a pressure within the electroproportional valve 16, but also a viscosity of the hydraulic fluid and a temperature of the hydraulic fluid.

The accumulator 18 is a hydraulic device that dampens rapid changes in pressure (such as pressure drops or pressure peaks) within the fluid conduit 26 between the electroproportional valve 16 and the piston assembly 20. The accumulator 18 facilitates smooth operation of the clutch assembly 22. The accumulator 18 is in fluid communication with the piston assembly 20 and the electroproportional valve 16. As shown in FIG. 2, the accumulator 18 includes a draining orifice 38. A flow of hydraulic fluid through the draining orifice 38 is dependent on a pressure within the fluid conduit 26 between the electroproportional valve 16 and the piston assembly 20, but also a viscosity of the hydraulic fluid and a temperature of the hydraulic fluid.

The piston assembly 20 comprises a housing 40, a piston 42, a piston rod 44, and at least one return spring 46. The housing 40 is a hollow, cylindrical member in fluid communication with the electroproportional valve 16 through the fluid conduit 26 between the electroproportional valve 16, the piston assembly 20, and the accumulator 18. The piston 42 is a cylindrical member sealingly and slidingly disposed within the housing 40. The piston rod 44 is an elongate member in driving engagement with the piston 42. The piston rod 44 is sealingly and slidingly disposed through the housing 40. The at least one return spring 46 is a biasing member disposed between the piston 42 and the housing 40. When pressure at or above an engagement threshold is applied to the housing 40 by the electroproportional valve 16, the pressure within the housing 40 urges the piston 42 and the piston rod 44 towards the clutch assembly 22, while also compressing the at least one return spring 46. When pressure at or below a disengagement threshold is present within the housing 40, the at least one return spring 46 urges the piston 42 and the piston rod 44 into a starting position. As shown in FIG. 2, the housing 40 includes a draining orifice 48. A flow of hydraulic fluid through the draining orifice 48 is dependent on a pressure within the housing 40, a portion of which may be generated by centripetal forces, but also a viscosity of the hydraulic fluid and a temperature of the hydraulic fluid.

The clutch assembly 22 comprises a housing 50, a first plurality of plates 52, a second plurality of plates 54, and a pressure plate 56. The housing 50 is a hollow member into which a transmission fluid is disposed. The first plurality of plates 52 and the second plurality of plates 54 are rotatingly disposed within the housing 50. The pressure plate 56 is disposed adjacent the first plurality of plates 52 and the second plurality of plates 54 and may be urged towards the first plurality of plates 52 and the second plurality of plates 54 by the piston rod 44. The first plurality of plates 52 is interleaved with the second plurality of plates 54. Within the clutch assembly 22, an input member (not shown) is drivingly engaged with one of the first plurality of plates 52 and the second plurality of plates 54 and an output member (not shown) is drivingly engaged with a remaining one of the first plurality of plates 52 and the second plurality of plates 54. A pressure in which the piston rod 44 contacts the pressure plate 56 and where additional pressure would result in at least variable driving engagement between the first plurality of plates 52 and the second plurality of plates 54 is known as a kiss pressure. At pressures greater than the kiss pressure, torque is able to be transferred from the first plurality of plates 52 to the second plurality of plates 54. When pressure at or above the engagement threshold is applied to the housing 40 by the electroproportional valve 16, the pressure within the housing 40 urges the piston 42 and the piston rod 44 towards the clutch assembly 22, applying a pressure to the first plurality of plates 52 and the second plurality of plates 54 through the pressure plate 56. In response to the pressure, the first plurality of plates 52 becomes at least variably drivingly engaged with the second plurality of plates 54, causing the input member to be at least variably drivingly engaged with the output member.

It is understood that the schematic illustration shown in FIG. 2 is merely exemplary in nature, and that the invention may be adapted for use with any wet plate clutch system.

A method which includes the use of a prefill pulse at discrete times in relation to a shift, allows the piston assembly 20 and the clutch assembly 22 to be operated in a manner having increased repeatability, through accurate positioning of the piston 42 prior to initiating at least variable driving engagement between the first plurality of plates 52 and the second plurality of plates 54. As a result of accurately positioning the piston 42 prior to initiating at least variable driving engagement between the first plurality of plates 52 and the second plurality of plates 54, a shift quality of a vehicle (not shown) the method is incorporated in is improved.

The method which includes the use of a prefill pulse is based on an understanding of the components of the multi-plate clutch system 10 and how the components of the multi-plate clutch system 10 react to a filling profile.

The method relies on the piston 42 to be accurately positioned using the return spring 46. Further, an assumption needs to be made that an amount of hydraulic fluid between the piston 42 and the electroproportional valve 16 is relatively constant. This means that the fluid conduit 26 between the electroproportional valve 16 and the piston assembly 20 is full of hydraulic fluid. Through the application of a small pressure to the piston 42, the fluid conduit 26 between the electroproportional valve 16 and the piston assembly 20 is filled. However, the small pressure must not fully compensate for the force exerted by the return spring 46.

Under such an assumption, the piston 42 is able to react very quickly to the electroproportional valve 16 when a filling profile is performed.

Flow ($q_s$) through the electroproportional valve 16 can be calculated through Bernoulli's principle (or the deduced law of Torricelli), which is shown in Equation 1. In Equation 1, flow is represented by $q_s$, $A_0$ is a surface area of a valving orifice, $P_s$ and $P_c$ are respectively pressures inside and outside of a pressure vessel and $K_0$ is a factor depending on a density of the fluid. A correction factor may be added to account for a viscosity and a shape of the valving orifice.

$$q_s = K_0 A_0 sgn(P_s - P_c)\sqrt{|P_s - P_c|} \qquad \text{Equation 1}$$

The method also accounts for an effect of a pressure rise that occurs at an outer radius of the housing 50 of the clutch assembly 22 that occurs due to centripetal forces. Equation 2 is an equation for calculating a radial pressure distribution in a presence of rotational speed of the clutch assembly 22. Equation 2 relies on an assumption that the transmission fluid within the housing 50 is rotating at the same speed as one of the first plurality of plates 54 and the second plurality of plates 56. Furthermore, there is an assumption that the housing 50 is filled with transmission fluid. Such an assumption is a desired and an expected situation. Such an assumption also exhibits a greatest amount of pressure, indicating that the situation should be accounted for in the method. It is also assumed that the electroproportional valve 16 compensates for a pressure loss due to fluid flow.

Equation 2 does not account for pressure dependent leaking which is more properly accounted for using Equation 1. However, pressure dependent leaking is largely dependent on a configuration of a multi-plate clutch system.

$$P(r) = \tfrac{1}{2}\rho\omega^2 r^2 + P_0 \qquad \text{Equation 2}$$

In Equation 2, the pressure at the center of clutch assembly 22 is represented by $P_0$, $\rho$ is a density of the transmission fluid, $\omega$ is a rotational speed of one of the first plurality of plates 54 and the second plurality of plates 56, and r is a radius at which P(r) is calculated. The force applied by the hydraulic fluid can be calculated by integrating the pressure distribution along the effective surface of the pressure plate 56. A result is shown in Equation 3.

In Equation 3, $r_o$ represents an outer radius and $r_i$ represents an inner radius The force is a function of initial pressure, a size of the clutch, and rotational speed. The force should remain smaller than a force of the return spring 46 at a fully extended position.

$$F = \tfrac{1}{4}\rho\omega^2\pi(r_o^4 - r_i^4) + P_0\rho(r_o^2 - r_i^2) \qquad \text{Equation 3: Force Applied to Piston by ATF}$$

Figure 3:
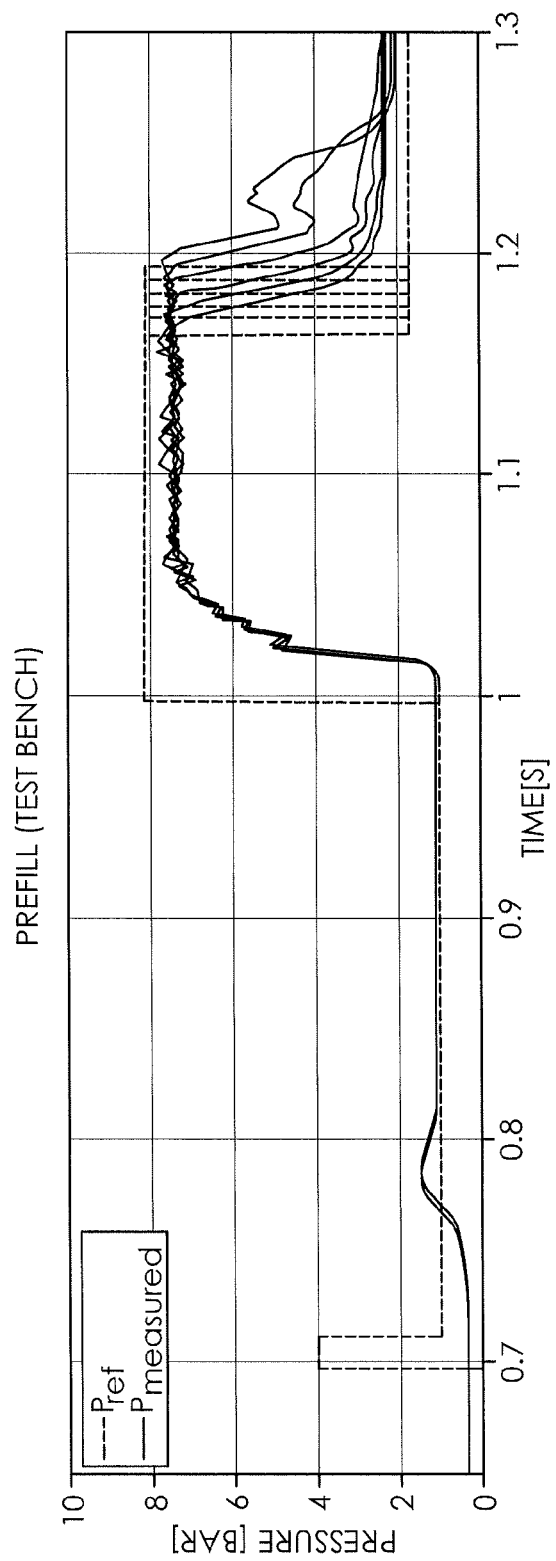
FIG. 3 is a graph which illustrates several pressure profiles of an engaging hydraulic piston associated with a wet clutch, the hydraulic position engaging according to a method of the present invention.

FIG. 3 illustrates several consecutive fillings that were performed according to the method which includes the use of a prefill pulse. The fillings were performed with the same or similar pressure signals, and are shown using dashed lines. As shown in FIG. 3, a plurality of measured response to the pressure signals, shown using solid lines, are fairly consistent.

As can be seen from FIG. 3, with a prefill pulse implemented, the filling is much more consistent. As a non-limiting example, in FIG. 3, the prefill pulse is shown to occur at 0.7 seconds in the pressure signal; the measured responses to the prefill pulse are shown to occur closer to 0.8 seconds. Even with varying fill times (represented using dashed lines), a consistent behavior is achieved. The prefill pulse could be made dependent on a time between shifts or temperature, but depending on the implemented solution, corrections are unnecessary. As a result of implementing the prefill pulse, the filling is only dependent on temperature, there is a vastly faster pressure response in all situations, and the response of the multi-plate clutch system 10 is much more repetitive. Control of the multi-plate clutch system 10 is also simplified as a result of only requiring temperature compensation. The measured responses are more repeatable, and allow for a greatly improved robustness of the multi-plate clutch system 10.

It is possible to implement the method which includes the use of the prefill pulse in a plurality of different ways. The method which includes the use of the prefill pulse can be implemented by incorporating the prefill pulse into a shifting procedure, by executing the prefill pulse periodically for all disengaged clutches, by executing the prefill pulse to only a set of relevant clutches, and adapt the prefill pulse as a continuous signal When the prefill pulse is incorporated into a shifting procedure, the prefill pulse can be treated as an extension of a filling phase. While such an implementation achieves a desired goal of having repetitive behavior and a known starting point for the filling phase, it also causes the shifting procedure to take a longer amount of time.

The prefill pulse may be sent out periodically for all disengaged clutches. A period is then defined as an amount of time for which the variability on the clutch filling is within an acceptable parameters or a time in which the resulting variation can be characterized in a reliable way. While this method does not increase a time of the shifting procedure, the initial conditions of a given clutch may not be as consistent.

The prefill pulse may only be applied to a set of relevant clutches, instead of applying the prefill pulse to all of the clutches. Depending on a type of transmission, identifying the set of relevant clutches that will be used is easily determined. As the prefill pulse is not executed for all of the clutches, there are fewer losses without a loss of performance and repeatability. Building further on such an implementation, the prefill pulse may also be executed on an even more relevant set of clutches, such as the next clutch to be used. Instead of performing the prefill pulse periodically, it is done in time for the shift. In embodiments of the invention in which an automatic shift scheduler is used, predicting a timing of a shift is easily determined. While more difficult; such a method may also be adapted for use with a manual transmission.

Lastly, the prefill pulse can also be executed as a continuous signal. By using a continuous signal, the method ensures that the fluid conduits are filled at substantially all times and that each of the clutches is in a substantially fixed and known condition. In view of the centrifugal effect described hereinabove, care must be taken so that a pressure is low enough proportional to the speed so that the pressure does not cause the piston to move. The continuous signal which provides the prefill pulse can be performed for all clutches or for only the relevant ones, either at all times or just before a shifting procedure.

In use, the controller 24 sends out the prefill pulse or the continuous signal as a feedforward pressure signal. Depending on the type of implementation, the controller 24 calculates an amplitude of the signal based on a number of parameters. As non-limiting examples, these parameters include a time between shifts, a temperature, and a rotational speed. After the prefill pulse, or during the continuous signal, the pressure is held at a pressure that is low enough not to move the piston 42 against the force applied by the return spring 46 at a maximum extended position.

This pressure depends on a rotational speed of the transmission fluid within the clutch assembly 22. Due to centripetal forces, the pressure in the transmission fluid can increase along an outer edge of the housing 50, as described hereinabove. Such a pressure should not be too high as not to override the force applied by the return spring 46 which holds the piston 42 back. The relation between rotational speed and pressure along the radius can be calculated as described hereinabove and shown in Equation 1. Equation 1 can be experimentally verified by determining a pressure at which the piston 42 starts moving at a given rotational speed. The radial pressure can then be integrated along a useful radius of the pressure plate 56 and compared to a pressure necessary to move the piston 42, divided by the effective surface of the pressure plate 56.

Figure 4:
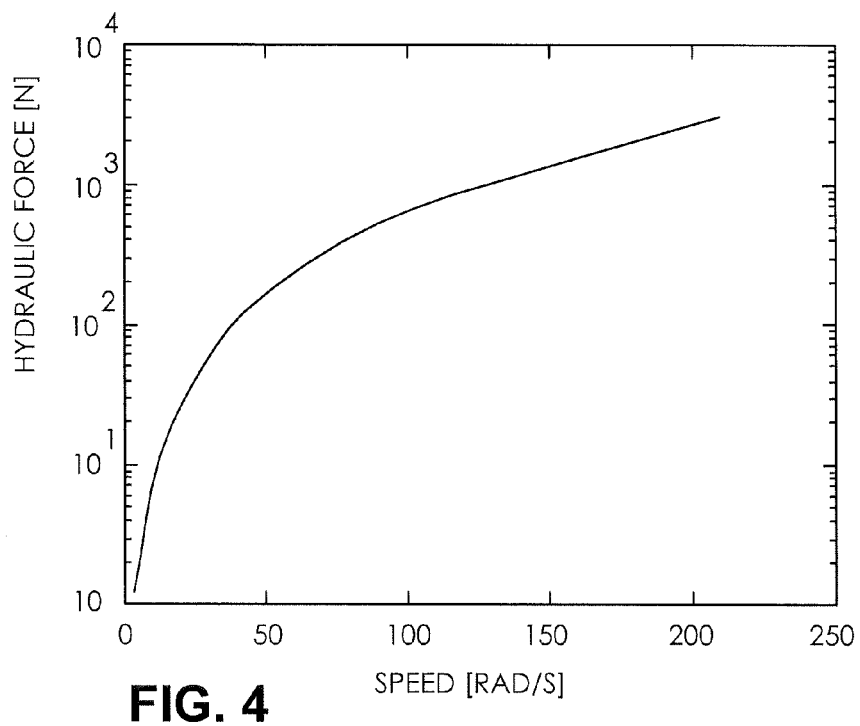
FIG. 4 is a graph which illustrates a self-generated hydraulic force with respect to rotational speed of the multi-plate clutch system shown in FIG. 3.

A relationship between a generated hydraulic force with respect to rotational speed is shown in FIG. 4. In FIG. 4, an inner and outer radius, an initial pressure, and a spring force have been maintained constant. The effect of the rotational speed, however, is substantial and cannot be neglected.

Figure 5:
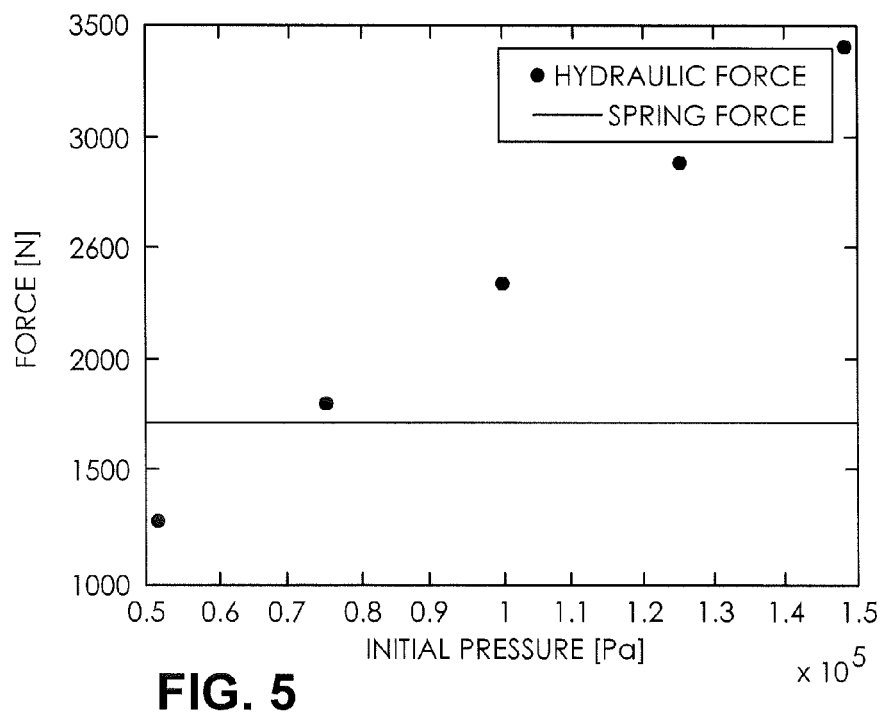
FIG. 5 is a graph which illustrates an increase in hydraulic force with respect to initial pressure and a spring force of the multi-plate clutch system shown in FIG. 3.

FIG. 5 illustrates an increase in hydraulic force with respect to initial pressure. In FIG. 5, the rotational speed is maintained as a constant. The force of the return spring 46 at a fully extended position is also indicated in FIG. 5. The controlled variable is indicated as the initial pressure on a horizontal axis. From FIG. 5, it is clear that the initial pressure should be calculated so that a resulting hydraulic force is smaller than the force applied by the return spring 46.

By using the strategies and operation described above, the multi-plate clutch system 10 according to the invention has greatly improved repeatability. The improved repeatability results in improved performance of shift control algorithms and consequently shift quality. The multi-plate clutch system 10 according to the invention eliminates variability without requiring a complex scheduling of several parameters as known in the prior art. In the multi-plate clutch system 10 according to the invention, the filling phase only has to be scheduled in terms of a single parameter, temperature. Accordingly, a control of wet plate clutch system such as the multi-plate clutch system 10 becomes more robust and less complex.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A method for controlling a wet clutch, the clutch comprising:
   a pump for providing a housing with a hydraulic fluid,
   a piston being movably disposed in the housing, the piston being movable into an extended position by a preloaded spring and into a retracted position by applying an engagement pressure on the piston by the hydraulic fluid, wherein in the retracted position torque is transmittable through the clutch,
   a fluid conduit connecting the pump and the housing,
   the method comprising the steps of
   prefilling the clutch by applying a prefill pressure on the piston, thereby prefilling the fluid conduit line and the housing with the hydraulic fluid, the prefill pressure being lower than the engagement pressure required to move the piston into the retracted position, and
   providing a controller for controlling the pressure applied to the piston by taking into account at least one of a temperature of a transmission fluid, a radial pressure distribution of the transmission fluid inside a clutch housing affected by a rotational speed of the clutch, and a time between shifts.

2. The method of claim 1, wherein the prefill of the housing is incorporated into a shift of a transmission.

3. The method according to one of the preceding claims, wherein the prefill of the housing is executed periodically or continuously or in time for a shifting procedure in at least one disengaged clutch.

4. The method according claim 3, wherein the continuous prefill is performed at all times or just before the shifting procedure.

5. The method according to claim 1, further including the steps of identifying clutches that are likely going to be used and prefilling the clutches that are likely going to be used.

6. The method according to claim 5, wherein the steps of identifying clutches that are likely going to be used are predicted based on an automatic shift scheduler.

7. The method according to claim 6, wherein the controller controls an electro proportional valve setting the pressure of the hydraulic fluid in the housing.

8. The method according to claim 7, wherein the electroproportional valve compensates pressure losses in the clutch.

9. Apparatus for controlling a wet clutch, including
a pump for providing a housing with a hydraulic fluid,
a piston being movably disposed in the housing, the piston being movable into an extended position by a preloaded spring and into a retracted position by applying an engagement pressure on the piston by the hydraulic fluid, wherein in the retracted position torque is transmittable through the clutch,
a fluid conduit connecting the pump and the housing,
an electroproportional valve disposed between the pump and the housing for regulating the pressure of the hydraulic fluid in the housing, the electroproportional valve being configured to prefill the housing by applying a prefill pressure on the piston, thereby prefilling the fluid conduit and the housing with the hydraulic fluid, the prefill pressure being lower than the engagement pressure required to move the piston into the retracted position, and
providing a controller for controlling the pressure applied to the piston by taking into account at least one of a temperature of a transmission fluid, a radial pressure distribution of the transmission fluid inside a clutch housing affected by a rotational speed of the clutch, and a time between shifts.

10. The apparatus according to claim 9, wherein an accumulator is disposed after the electroproportional valve and before the housing for dampening drops or peaks in the housing.

11. The apparatus according to claim 9, wherein a filter for filtering the hydraulic fluid is disposed at least one of before and after the pump.

12. The apparatus according to claim 11, wherein a pressure relief valve is present to limit the pressure difference over the filter disposed after the pump.

* * * * *